(12) United States Patent
Engleder

(10) Patent No.: US 7,381,043 B2
(45) Date of Patent: Jun. 3, 2008

(54) APPARATUS FOR REGULATING AN INJECTION MOULDING MACHINE

(75) Inventor: Stefan Engleder, Schwertberg (AT)

(73) Assignee: Engel Austria GmbH, Schwertberg (AT)

( * ) Notice: Subject to any disclaimer, the term of this patent is extended or adjusted under 35 U.S.C. 154(b) by 52 days.

(21) Appl. No.: 11/455,537

(22) Filed: Jun. 19, 2006

(65) Prior Publication Data
US 2007/0065531 A1   Mar. 22, 2007

(30) Foreign Application Priority Data
Sep. 20, 2005   (AT) ............................. GM632/2005

(51) Int. Cl.
B29C 45/76   (2006.01)

(52) U.S. Cl. ...................... 425/149; 425/150; 425/167; 425/593

(58) Field of Classification Search ................ 425/149, 425/150, 167, 593, 451.6
See application file for complete search history.

(56) References Cited

U.S. PATENT DOCUMENTS

| 3,534,442 | A | * | 10/1970 | Mahle | 425/150 |
| 4,594,065 | A | * | 6/1986 | Langlois et al. | 425/150 |
| 7,150,619 | B2 | * | 12/2006 | Uchiyama et al. | 425/149 |
| 7,244,378 | B2 | * | 7/2007 | Haruo et al. | 425/150 |

FOREIGN PATENT DOCUMENTS

| DE | 43 45 034 A1 | 10/1994 |
| DE | 44 29 304 C1 | 6/1995 |
| EP | 1 405 709 A1 | 4/2004 |
| JP | 4-86211 | * 3/1992 |

OTHER PUBLICATIONS

B. Bona, C. Giacomello, C. Greco, M. Malandra, Position control of a plastic injection moulding machine via feedback linearization, Proceedings of the 31st IEEE Conference on Decision and Control, vol. 3, pp. 2591-2593, 1992.
R.F. Fung, Motion control of an electrohydraulic actuated toggle mechanism, Mechatronics, vol. 11, pp. 939-946, 2001.
A. Isidori, Nonlinear control systems, Springer, London, 1991, pp. 137-191.
J.J. Slotine, Applied nonlinear control; Prentice-Hall, Englewood Cliffs, NJ, 1991, pp. 246-267.

* cited by examiner

Primary Examiner—James Mackey
(74) Attorney, Agent, or Firm—Notaro & Michalos P.C.

(57) ABSTRACT

An apparatus for regulating an injection moulding machine comprising a crank lever mechanism for moving the movable mould mounting plate, wherein the crosshead of the crank lever mechanism is driven by a drive device. The regulating apparatus is constructed as a cascade regulator, wherein the follower regulating circuit (inner regulating circuit (11)) is a force regulator which compares a force reference value ($F_{H,ref}$) supplied by a guide regulating circuit to a force actual value ($F_H$) detected by a force measuring device (14) at the drive device (5, 6) and outputs a control parameter or parameters to the drive device (5, 6), and wherein the guide regulating circuit (outer regulating circuit (9)) is a trajectory follower regulator which in dependence on a stored or generated reference trajectory ($x_{C,ref}, \dot{x}_{C,ref}, \ddot{x}_{C,ref}$) for the crosshead ascertains and outputs on the one hand a travel and/or speed actual value ($x_C, \dot{x}_C$) detected by a travel measuring device (12) at the crosshead (4) and on the other hand the force reference value ($F_{H,ref}$) for the follower regulating circuit.

7 Claims, 2 Drawing Sheets

APPARATUS FOR REGULATING AN INJECTION MOULDING MACHINE

Figure 1:
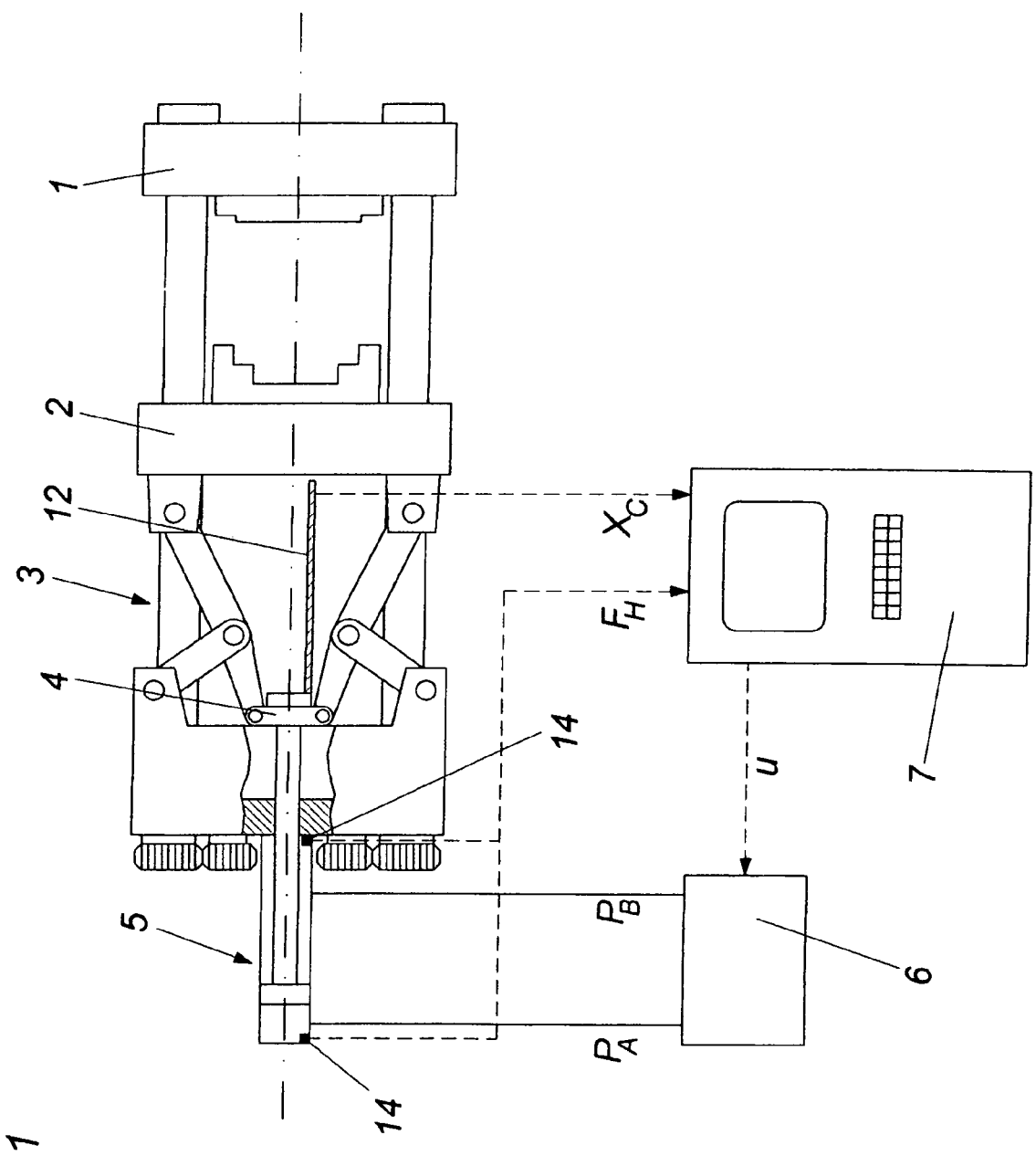

The invention concerns an apparatus for regulating an injection moulding machine comprising a crank lever mechanism for moving the movable mould mounting plate, wherein the crosshead of the crank lever mechanism is driven by a drive device.

In order to regulate an injection moulding machine in such a way that it has short cycle times, in a first step it is possible to ascertain a time-optimised motion trajectory for the crosshead of the crank lever mechanism and then store that reference trajectory. Once that reference trajectory is obtained the object is to provide a regulating apparatus which ensures that the crosshead in the injection moulding machine which is in operation actually follows the previously stored or calculated reference trajectory in the continuously successive cycles.

In accordance with the invention that is achieved in that the regulating apparatus is constructed as a cascade regulator, wherein the follower regulating circuit (inner regulating circuit) is a force regulator which compares a force reference value supplied by a guide regulating circuit to a force actual value detected by a force measuring device at the drive device and outputs a control parameter to the drive device, and wherein the guide regulating circuit (outer regulating circuit) is a trajectory follower regulator which in dependence on a stored or generated reference trajectory for the crosshead ascertains and outputs on the one hand a travel and/or speed actual value detected by a travel measuring device at the crosshead and on the other hand the force reference value for the follower regulating circuit.

As the problems are generally non-linear (on the one hand because of the varying transmission ratio between the crosshead and the movable mould mounting plate and on the other hand because of the non-linearities in the drive device), regulator concepts have already been proposed on the basis of input/output linearisation (feedback linearisation). (B Bona, C Giacomello, C Greco, M Malandra, *Position control of a plastic injection moulding machine via feedback linearization, Proceedings of the 31st IEEE Conference on Decision and Control*, vol 3, pages 2591-2593, 1992; R F Fung *Motion control of an electrohydraulic actuated toggle mechanism, Mechatronics*, vol 11, pages 939-946, 2001).

Theoretical considerations relating to input/output linearisation and output tracking are to be found in A Isidori, *Nonlinear control systems*, Springer, London 1991.

In the state of the art the entire system (drive device and crank lever system) is I/O linearised. The cascade structure according to the invention provides that simpler inversion of the subsystems (drive device on the one hand and trajectory tracking of the crank lever system on the other hand) is possible. It is thus possible to manage with less complex regulator equations for computing the respective control parameters.

A further advantage of cascading is that the reference trajectories only have to be present as far as the second derivative (reference acceleration). If the entire system is linearised the third derivative (reference jerk) is also necessary.

The cascading provides that the regulator concept according to the invention can be used both for electromechanical and also for electrohydraulically driven crank levers. Only the inner regulating circuit (follower regulating circuit) has to be changed.

In accordance with a preferred embodiment of the invention it is provided that the guide regulating circuit (outer regulating circuit) has a regulating section of integrating character.

In the state of the art the trajectory follower regulation does not have any integrating character. Stationary accuracy of the end positions therefore cannot be guaranteed therein—in contrast to the specified preferred embodiment of the invention.

Further advantages and details of the invention are described more fully with reference to the specific description hereinafter.

Figure 2:
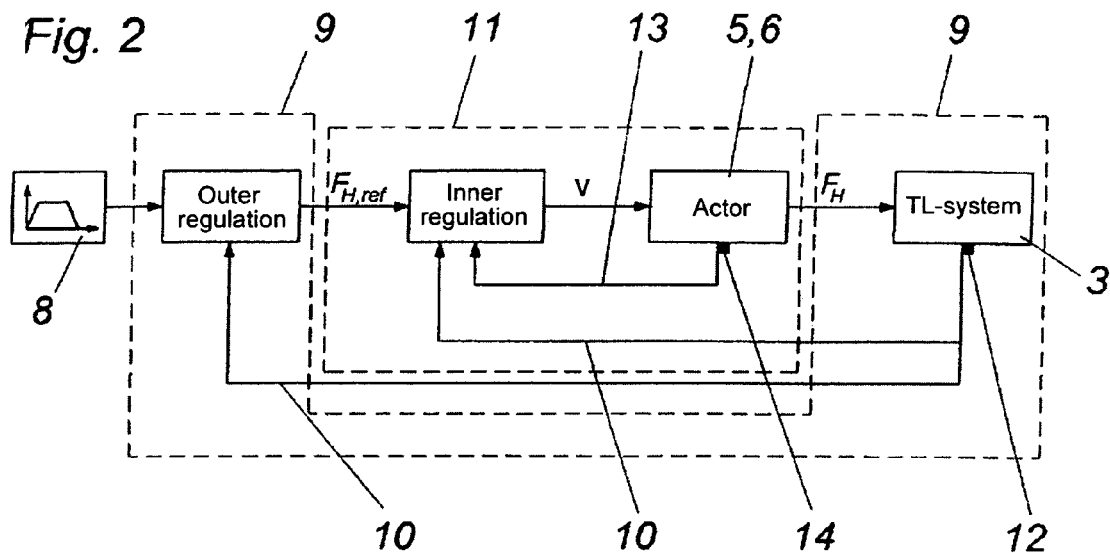
Figure 3:
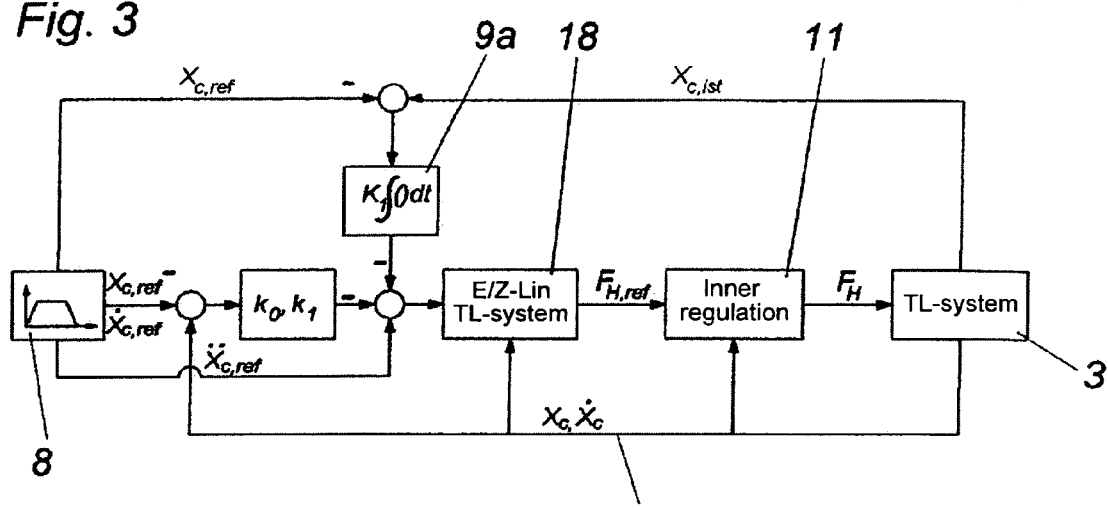
Figure 4:
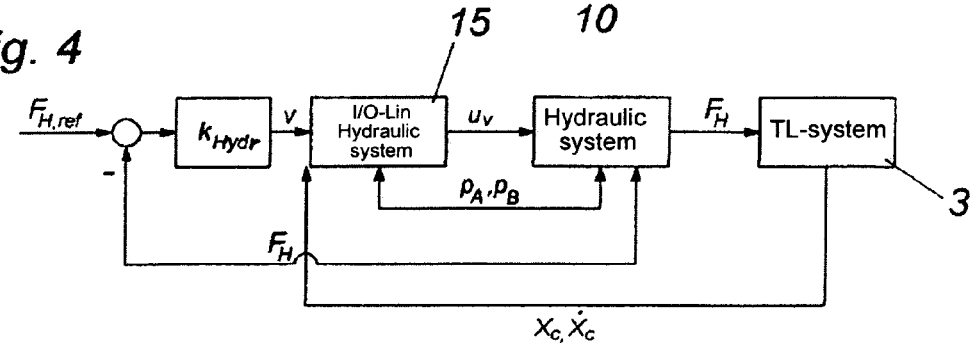
Figure 5:
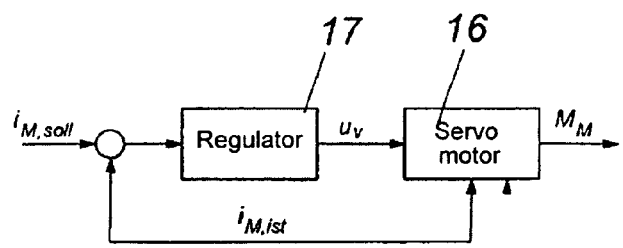

FIG. 1 shows the diagrammatic closing side of a crank lever injection moulding machine together with a diagrammatic representation of an embodiment of a regulating apparatus according to the invention, FIG. 2 shows a schematic block circuit diagram of an embodiment of the regulating apparatus according to the invention, FIG. 3 shows details of the guide regulating circuit (outer regulating circuit), FIG. 4 shows a diagrammatic representation of a guide regulating circuit (inner regulating circuit) for regulating an electrohydraulically driven crank lever injection moulding machine, and FIG. 5 shows the same representation for an electromechanically driven crank lever injection moulding machine.

In the case of the injection moulding machine shown in FIG. 1, only the closing side is illustrated. The injection side can be constructed in accordance with the state of the art. The closing side has a fixed mould mounting plate 1, a movable mould mounting plate 2 and a crank lever mechanism 3 which drives the movable mould mounting plate 2. In this arrangement the crosshead 4 of the crank lever mechanism 3 is driven by a hydraulic piston-cylinder unit 5. The hydraulic fluid which is under pressure $p_A$, $p_B$ is provided in this case by a hydraulic circuit 7 which preferably includes an electrically driven hydraulic pump and at least one proportional valve. In that respect the arrangement substantially corresponds to the state of the art.

In accordance with the invention there is now provided a regulating apparatus (implemented in the electronic data processing system 7 of the machine control) which causes the crosshead 4 to follow a previously stored reference trajectory. That reference trajectory can for example be computed offline in order to move the crosshead in the shortest possible cycle time while observing restriction parameters (such as the maximum speed and acceleration of the crosshead and the movable mould mounting plate). The reference trajectory can be stored for example in the form of the crosshead position as a function of time, in which respect it is possible for example to store the values in millisecond steps in a memory. In principle the derivatives required for the regulation effect could always be currently computed from those values. It is however also possible for the derivatives of the reference trajectory also to be stored as a function of time in order to have them immediately ready for regulation.

FIG. 2 now shows the cascaded structure of the regulating arrangement according to the invention. The reference trajectory for the crosshead is stored in a memory 8. The outer regulating circuit 9 is in the form of a trajectory follower regulator which, in dependence on the stored reference trajectory for the crosshead on the one hand and a travel and/or speed actual value transported by way of the line 10, ascertains the force reference value $F_{H,ref}$ and outputs it to the inner regulating circuit 11. The travel and/or speed actual value is detected in that case by a travel measuring device 12 at the crank lever system 3. The travel measuring device is also shown diagrammatically in FIG. 1.

FIG. 2 further shows the inner regulating circuit 11 which is in the form of a force regulator. It ensures that the actuator (that is the electromechanical drive device 5, 6) actually exerts the force reference value $F_{H,ref}$ which is predetermined by the outer regulating circuit on the crank lever system or more precisely on the crosshead 4 thereof. By way of the actual value line 13 the inner regulating circuit receives a force actual value detected by pressure sensors 14, or the corresponding pressure values. In addition a travel and/or speed actual value is passed to the inner regulating circuit 11 by way of the actual value line 10.

The linearising regulating law (simplified disregarding the kinematics and dynamics of the levers of the crank lever system) reads as follows:

$$F_H = \left(\frac{m_B}{i_{CL}^2} + m_C\right) \cdot v - \frac{m_B}{i_{CL}^3} \frac{di_{CL}}{dx_C} \dot{x}_C^2$$

wherein $m_B$ is the mass of the movable mould mounting plate, $m_C$ is the mass of the crosshead, $i_{CL}$ is the transmission ratio of the crank lever mechanism, $x_C$ is the crosshead position and v represents the notional input.

Optionally the crosshead mass can be disregarded in the foregoing equation ($m_C=0$) if the regulating error is found to be acceptable.

In addition it is advantageous also to take account of the closing force. For that reason the above equation in the closing force range (that is to say while the plates are touching) is expanded by the term:

$$F_{CF,H} = \frac{1}{i_{CL}} C_g \Delta x_a$$

That represents a linear closing force configuration related to the crosshead, in dependence on the spring deflection $\Delta x_a$ (relaxed position corresponds to plate contact) with $C_g$ as the total spring stiffness of the crank lever system.

In order to achieve stationary accuracy of the end position of the movable mould mounting plate it is desirable for the outer regulating circuit (guide regulating circuit/trajectory follower regulating circuit) to be expanded by integration of the regulating error $e=x_C-x_{C,ref}$. Accordingly the linear regulator is of the following form:

$$v=\ddot{x}_{C,ref}-k_0 e - k_1 \dot{e} - K_1 \int e \, dt$$

wherein the $k_0$, $k_1$ and $K_1$ represent constant coefficients.

For implementation thereof the guide regulating circuit can be designed as shown in FIG. 3. Besides the PD component the outer regulating circuit has an integral component 9a with integrating character in order to ascertain the foregoing value v.

By means of input/state linearisation the desired force reference value $F_{H,ref}$ is produced on the regulator section 18, wherein linear regulators can be used in spite of the high degree of non-linearity. The basic idea of input/state or input/output linearisation (I/S or I/O linearisation) of a non-linear system is to obtain a linearising regulator law by algebraic conversion of the state equations so that a linear system is produced by prior implementation of that law.

Linear regulation frameworks can then be applied to the system linearised in that way. I/S or I/O linearisation is already known per se (see A Isidori. *Nonlinear control systems,* Springer, London 1991, J J Slotine. *Applied nonlinear control,* Prentice-Hall, Englewood Cliffs, N.J., 1991) so that there is no need to enter into a more detailed discussion thereof.

As is already apparent from FIG. 3 the inner regulating circuit 11 serves to hold the force value $F_H$ supplied to the crank lever system 3 at the reference value for the force $F_{H,ref}$ which is predetermined by the outer regulating circuit.

That inner regulating circuit for an electrohydraulic injection moulding machine is shown in detail in FIG. 4. The inner regulating circuit has an input/output linearisation means 15.

The I/O linearising regulating law which requires as input the notional input v and the measured pressures $p_A$, $p_B$ as well as the crosshead position $x_C$ and crosshead speed $\dot{x}_C$ linearises the non-linear hydraulic system. An upstream-disposed linear force regulator (for example a P-regulator) furnishes the notional input:

$$v=k_H(F_{H,ref}-F_H)$$

Another linear regulating law can also be used. One possibility is for example also calculating $\dot{F}_H$ in the outer regulating circuit and then adding it on as preliminary control to the notional parameter for the regulator.

In addition implementation of I/O linearisation requires the system pressure, the tank pressure (which can both generally be assumed to be constant but upon measurement thereof can also be fed back) as well as the through-flow characteristics of the proportional valve in dependence on the valve piston deflection at constant nominal pressure.

By a suitable choice or modelling of the I/O linearising regulating law it is possible to distinguish between the various operating modes of an injection moulding machine. They include mould opening, mould closing without rapid-motion switching and mould closing with rapid-motion switching.

FIG. 5 shows the inner regulating circuit for an electromechanically driven injection moulding machine. In this case the outer regulating circuit can remain substantially the same. The difference is that, instead of the hydraulics, a servomotor 16 is used, which is actuated by a servomotor regulator 17. Here torque values correspond to the force values in the electrohydraulic embodiment, in which respect the expression 'force' used in the present description is to be considered broadly and is also intended to embrace force-related values such as for example the 'torque'.

It will be appreciated that the invention is not restricted to the illustrated embodiments. Numerous modifications and alternatives within the scope of the claims are certainly conceivable and possible. It should also be mentioned that the terms 'crank lever mechanism' and 'crosshead' are to be viewed very broadly. In accordance with the present application they include generally mechanical systems which have a variable transmission ratio. The crosshead is typically linearly moved. Rotatory movements however are also possible, for example a thrust crank drive. There the rotationally moved pivot point of the thrust crank then corresponds to the crosshead.

The invention claimed is:

1. An apparatus for regulating an injection moulding machine comprising a crank lever mechanism for moving a movable mould mounting plate, wherein a crosshead of the crank lever mechanism is driven by a drive device, characterised in that the regulating apparatus is constructed as a cascade regulator, wherein a follower regulating circuit is a force regulator which compares a force reference value supplied by a guide regulating circuit to a force actual value detected by a force measuring device at the drive device and outputs a control parameter or parameters to the drive device, and wherein the guide regulating circuit is a trajectory follower regulator which in dependence on a stored or generated reference trajectory for the crosshead ascertains and outputs on the one hand a travel and/or speed actual value detected by a travel measuring device at the crosshead and on the other hand the force reference value for the follower regulating circuit.

2. Apparatus according to claim 1 characterised in that the guide regulating circuit has a regulating section with integrating character.

3. Apparatus according to claim 1 characterised in that the guide regulating circuit has a linear regulator which regulates a section linearised by means of input/state linearisation.

4. Apparatus according to claim 1 characterised in that the follower regulating circuit has a linear regulator which regulates a section linearised by means of input/output linearisation.

5. An injection moulding machine having a regulating apparatus according to claim 1.

6. An injection moulding machine according to claim 5 characterised in that the drive device for the crosshead is an electrohydraulic drive device.

7. An injection moulding machine according to claim 5 characterised in that the drive device for the crosshead is an electromechanical drive device.

* * * * *